United States Patent [19]

Wallther

[11] 4,439,052
[45] Mar. 27, 1984

[54] DEVICE FOR COUPLING TOGETHER LATERALLY DIRECTED SCAFFOLD ELEMENTS TO UPRIGHTS IN A SCAFFOLD OR THE LIKE

[75] Inventor: Harry Wallther, Limmerhult, Hindås, Sweden

[73] Assignee: Ställningsgruppen i Göteborg Aktiebolag, Göteborg, Sweden

[21] Appl. No.: 276,344

[22] PCT Filed: Oct. 15, 1980

[86] PCT No.: PCT/SE80/00250
§ 371 Date: Jun. 11, 1981
§ 102(e) Date: Jun. 11, 1981

[87] PCT Pub. No.: WO81/01164
PCT Pub. Date: Apr. 30, 1981

[51] Int. Cl.³ .................................................. F16B 1/00
[52] U.S. Cl. ........................................ 403/49; 403/246; 182/179; 211/192
[58] Field of Search ............... 403/49, 246; 182/178, 182/179; 211/190, 191, 192

[56] References Cited

U.S. PATENT DOCUMENTS

| | | | |
|---|---|---|---|
| 3,420,557 | 1/1969 | Francis et al. | |
| 3,817,641 | 6/1974 | Steele et al. | 182/179 X |
| 4,039,264 | 8/1977 | Sharp | 403/49 X |
| 4,111,579 | 9/1978 | Knight | 403/49 X |
| 4,180,342 | 12/1979 | Layher | 403/49 X |
| 4,273,463 | 6/1981 | Dobersch | 403/49 X |

FOREIGN PATENT DOCUMENTS

| | | | |
|---|---|---|---|
| 1684219 | 3/1971 | Fed. Rep. of Germany | |
| 1261335 | 4/1961 | France | |
| 2842831 | 12/1979 | Netherlands | 403/49 |
| 1479068 | 4/1977 | United Kingdom | |

Primary Examiner—Andrew V. Kundrat
Assistant Examiner—Joseph A. Fischetti

[57] ABSTRACT

A device for coupling together laterally directed scaffold elements (11) and uprights in a scaffold (12) or the like. Each coupling device (1) includes an engagement member (2) which is connected to the upright and is open upwards at least in the position of use. Said member is provided with a wall (6) which extends with spacing from the upright and which delimits a space (4) situated between the upright and the wall. A hook-shaped member (9) is situated at least at one end of said scaffold element (11) and is adapted to hook into the engagement member. A first clamping member (14) is movable in relation to the scaffold member and is adapted to bear against the upright and the engagement member. A second clamping member (22/31) is adapted, in a locking position to be forcibly gripped between the first clamping member and the scaffold element. Thereby the clamping member is pressed towards the upright (3) and the scaffold element (11) is pressed in the direction out from the upright and as a result is clamped by means of the hook-shaped member (9) in the engagement member (2).

8 Claims, 6 Drawing Figures

DEVICE FOR COUPLING TOGETHER LATERALLY DIRECTED SCAFFOLD ELEMENTS TO UPRIGHTS IN A SCAFFOLD OR THE LIKE

TECHNICAL FIELD

The present invention relates to a device for coupling together laterally directed scaffold elements and uprights in a scaffold or the like.

BACKGROUND OF THE INVENTION

Coupling devices for scaffolds are found in many different constructions. For example, there are coupling devices which comprise a part belonging to an upright of the scaffold with a plurality of elements projecting radially in different predetermined directions, in which elements belonging to transverse scaffold elements are adapted to be hooked. This type of coupling device certainly renders possible an individual coupling together and disconnection of the transverse scaffold elements but these can only be coupled to the upright in certain predetermined directions, usually in four directions at right angles to one another. On the other hand, there are known devices with which transverse scaffold elements can be connected to the upright in any desired direction but these are so constructed, on the other hand, that individual disconnection of the transverse scaffold elements is not possible, that is to say that at a coupling point with a plurality of scaffold elements extending transversely in relation to the upright, all these scaffold elements must be coupled to or disconnected from the upright even if it is only desired to disconnect some of the transverse scaffold elements.

Technical problem:

The purpose of the present invention is to eliminate the above-mentioned disadvantage in known coupling devices and to provide a device which permits, on the one hand coupling of a transverse scaffold element to an upright in an arbitrary direction out from the upright and on the other hand a coupling together or disconnection independent of other transverse scaffold elements.

The solution:

Said purpose is achieved by means of a device which is characterised in that each coupling device is mainly composed of an engagement member which is connected to the upright and is open upwards at least in the position of use, with a wall which extends with spacing from the upright and which delimits a space situated between the upright and the wall, a hook-shaped member which is situated at least at one end of said scaffold element and which is adapted to be hooked into the engagement member, a first clamping member which is movable in relation to the scaffold element and which comprises one or more clamping surfaces adapted to bear against the upright and/or the engagement member, and another clamping member which is adjustable between a releasing position and a locking position and which is adapted, in the locking position, to be forcibly gripped between the first clamping and the scaffold element so that the clamping member is urged in the direction towards the upright and the scaffold element is urged in the direction outwards from the upright and as a result is clamped by means of the hook-shaped member in the engagement member.

DESCRIPTION OF THE FIGURES

The invention will be described in more detail below with some examples of embodiment with reference to the accompanying drawings in which

FIG. 5 shows the coupling device according to the invention in a further modified embodiment, while

PREFERRED FORMS OF EMBODIMENT

Figure 1:
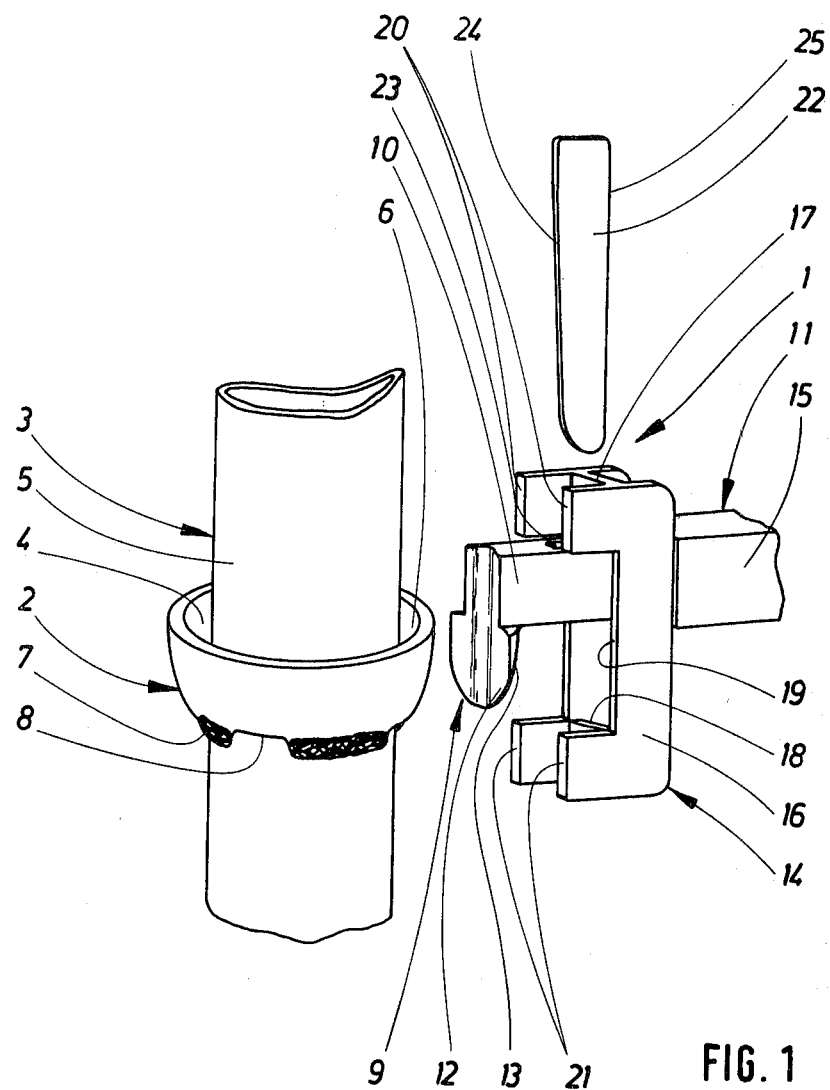
FIG. 1 shows, in perspective, an exploded view of a coupling device according to the invention in a first embodiment.

The construction of the coupling device can be seen from the embodiment of FIG. 1 which shows an exploded view. From this it can be seen that the coupling device 1 according to the invention comprises an engagement member, in the example shown constructed as a mainly bowl-shaped member 2, which belongs to an upright 3 which is included in a scaffold or the like. The bowl-shaped member 2 extends round the whole periphery of the upright 3 and forms a substantially axially symmetrical body which delimits a space 4 between the cylindrical wall 5 of the upright and the concave wall 6 of the bowl-shaped member 2 with a spherically curved surface for example. In the example shown, the bowl-shaped member is firmly welded to the upright and comprises drainage openings 8 between the welds 7 for the discharge of water, rubbish and the like. These drainage openings 8 can also be used as cleaning holes, in which case larger objects can easily be poked out by means of a screwdriver or the like which is introduced into the openings 8 from below. The coupling device 1 according to the invention further comprises a hook-shaped member 9 which projects down from an end portion 10 of a scaffold element 11. The scaffold element 11 consists, for example, of an elongated horizontal member which is included in a scaffold 12 which is shown by an example in FIG. 6. The hook-shaped member 9 comprises, on the one hand a surface 12 which is substantially adapted in shape to the shape of the wall 5 of the upright 3, and on the other hand a surface 13 which faces away from said surface 12 and which is substantially adapted in shape to the shape of the inner wall 6 of the bowl-shaped member 2. Further included in the coupling device 1 is a first clamping member 14 which is movable along the end portion 10 of the scaffold element 11 between the hook shaped member 9 and an elongated tube section 15 of which only a portion is shown in FIG. 1 and into which the end portion 10 is inserted for a distance. The tube section 15 is, for example, pressed onto the end portion 10 or welded to this. The first clamping member 14 comprises mainly two side pieces 16 and two transverse pieces 17, 18. The side pieces 16 each comprise a recess 19, adapted to receive the bowl-shaped member 2 in the assembled state, and each of the two clamping surfaces 20, 21, which are adapted to bear against the wall 5 of the upright 3. Further included in the coupling device 1 is another clamping member 22 which, in the example shown, is constructed in the form of a wedge which is adapted to be introduced into a transverse, through slit 23 in the end portion 10 which is made of a solid metal material, for example steel. The wedge 22 has two edges 24, 25 which converge in relation to one another in the downward direction and of which the one edge 24 is adapted to cooperate with the transverse pieces 17, 18 and the other edge 25 is adapted to cooperate with an end surface 27 (see FIGS. 2 and 3) in the slit 23 in a manner which will be described in more detail below.

Figure 2:
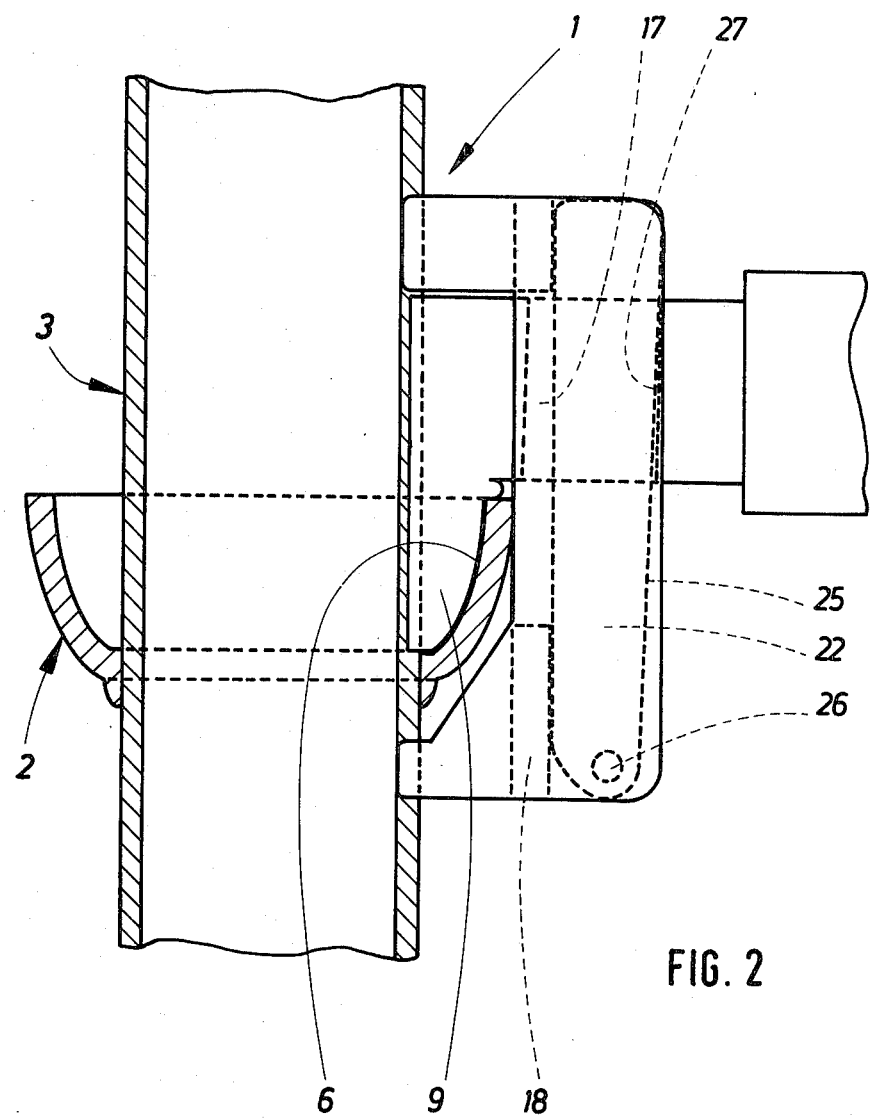
FIG. 2 shows a view partially broken away of the coupling device in the coupled state in a somewhat modified embodiment and FIG. 3 shows the coupling device of FIG. 2 in the partially disconnected state.

FIG. 2 shows in more detail how the various parts are adapted to cooperate with one another in the coupling device 1 according to the invention in its coupled state. The embodiment shown in FIGS. 2, 3 and 4 differs from the embodiment 1 only in that the wedge 22 comprises two laterally directed pins 26 which project laterally at each side of the wedge 22 and so form stop elements which strike against the under side of the end portion 10 and so prevent the wedge 22 from being taken out of the slit 23. As a result, an increased security is obtained in the coupling device according to the invention. The upper end position of the wedge can be seen from FIG. 3. Thus, in its assembled state, the operation of the coupling device is just the same as the embodiment according to FIG. 1 in the embodiment according to FIGS. 2, 3 and 4 while the position of the parts included differs somewhat during coupling and disconnection.

With the parts completely disconnected as shown in FIG. 1, the wedge 22 is thus completely removed and the clamping member 14 can be displaced sideways in the direction away from the hook-shaped member 12. Thus, when a scaffold element 11, for example an elongated part of a scaffold, is to be coupled to an upright 3, the hook-shaped member 9 is hooked into the bowl-shaped member 2, after which the clamping member 14 is pushed forwards so that its clamping surfaces 20, 21 bear against the wall 5 of the upright 3. The transverse pieces 17, 18 are then in such a position that the main part of the slit 23 is outside the transverse pieces. Then the wedge 22 is lowered into the slit 23 and is knocked down by means of a suitable tool, for example a hammer, a sledge-hammer or the like, and as a result of the shape of the wedge 22, the clamping member 14 is pressed with its clamping surfaces 20, 21 against the wall 5 of the upright 3, more specifically as a result of the fact that the edge 24 of the wedge 22 is pressed against the transverse pieces 17, 18 and the edge 25 is pressed against said edge surface in the slit 22. As a result, the hook-shaped member 9 is pressed simultaneously with its convex surface 13 against the inside of the bowl-shaped member 2. In order to obtain surface contact, the slit may advantageously be provided, at least in the last-mentioned edge surface, with an oblique surface which corresponds to the inclination of said edge 25 in the assembled state of the device. This is shown best in FIG. 2 which shows the bearing of the wedge 22 against the transverse pieces 17, 18 and its position in the slit 23.

In the assembled state of the coupling device, a very stiff coupling is obtained as a result of the fact that not only radially directed or axially directed forces in relation to the upright are taken up but also to a large extent breaking forces which tend to turn the transverse scaffold element 11 into different angular positions in relation to the upright.

The disconnection of the scaffold element 11 from the upright takes place, in principle, in the same manner as the connection but in reverse order and with reversed movements. Thus the wedge 22 is driven out of its completely introduced position, whereupon the clamping action on the clamping member 14 and the hook-shaped member 9 ceases. When the wedge 22 in the embodiment shown in FIG. 1 has been completely removed, the clamping member 14 can be moved backwards in the direction of the tube section 15, after which the scaffold element 11 with the hook-shaped member 9 can be lifted out of the bowl-shaped member 2.

Figure 3:
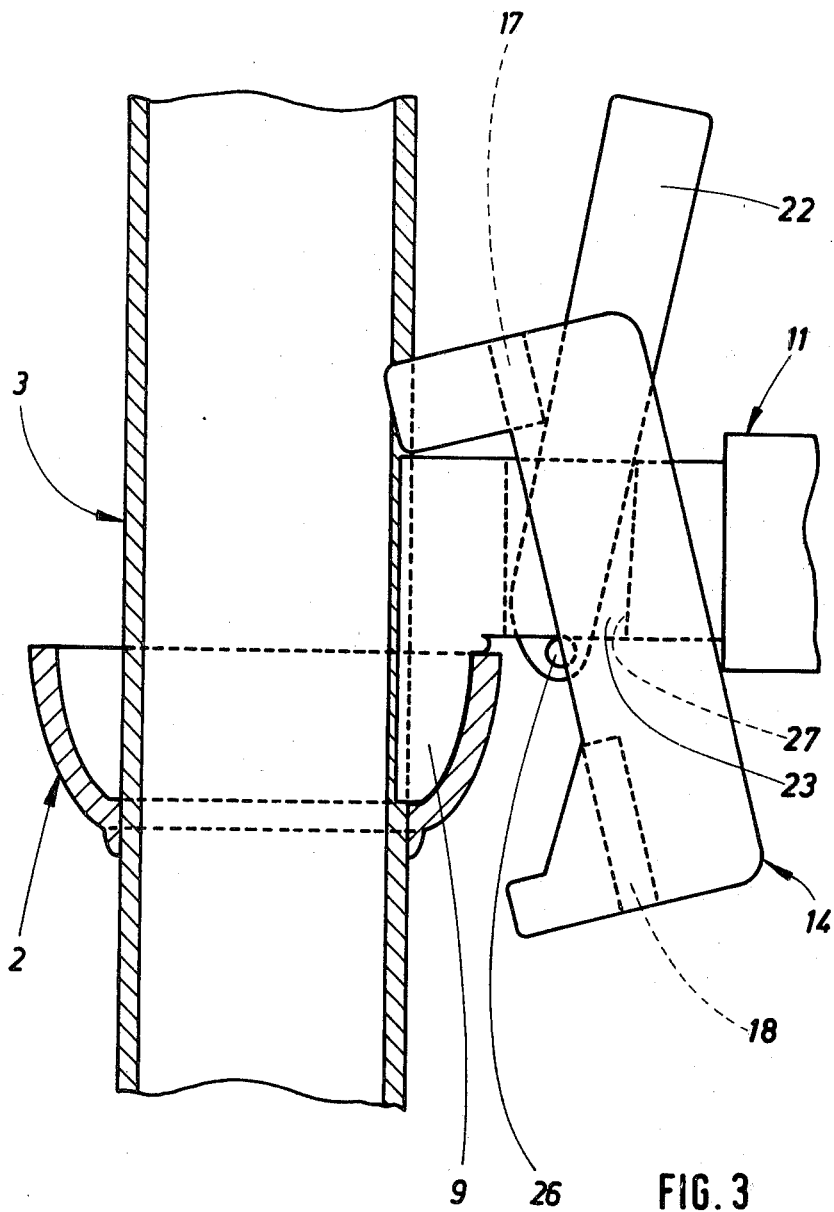
Figure 4:
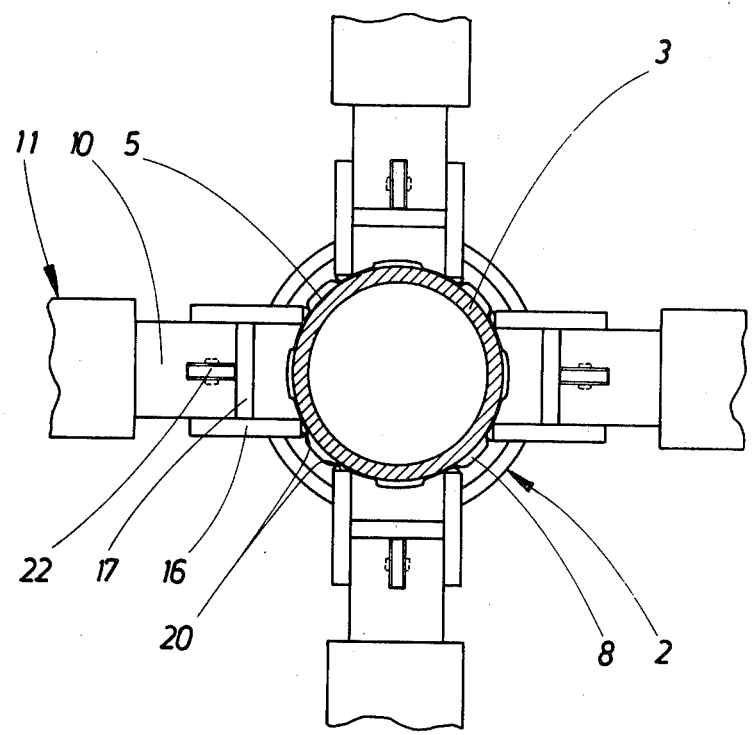
FIG. 4 shows, with a cross-section through an upright included in a scaffold the coupling device from above in the embodiment shown in FIGS. 2 and 3.

The coupling together by means of the coupling device in the embodiment shown in FIGS. 2, 3 and 4 takes place in principle in the same manner as with the embodiment shown in FIG. 1, but the wedge, as described above, in the initial position is only partially lifted out of the slit 23, which means that the clamping member 14 must be held turned substantially in the manner shown in FIG. 3 to enable the hook-shaped member 9 to be hooked into the bowl-shaped member 2. When this has been done, the clamping member 14 is applied in the same manner as described with reference to FIG. 1 with its clamping surfaces 20, 21 against the upright 3, after which the edge 22 can be driven down into the position shown in FIG. 2, which thus coincides with what was described with reference to FIG. 1.

In FIG. 4 the coupling device according to the invention is shown by way of example with four scaffold elements 11 connected to the upright 3 in direction at right angles to one another. According to the invention, however, any arbitrary directions can be selected for the scaffold elements 11 one the one hand in relation to one another and on the other hand in relation to a certain predetermined position of the upright 3. FIG. 4 shows that the clamping surfaces 20, 21 in the example shown are not bevelled obliquely to match the wall of the upright, which gives a particularly stable edge engagement, held against rotation, through edge contact between the clamping surfaces 20, 21 and the wall 5 of the upright. In practice a certain minor deformation of the wall 5 occurs, which gives a further improved engagement.

Thus, according to the invention, coupling together and disconnection can take place individually for each separate scaffold element 11 in relation to the upright 3. In the example shown in FIGS. 2, 3 and 4, on disconnection of one of the scaffold elements 11, the peg 22 is driven upwards into the release position shown in FIG. 3, after which the clamping member 14 can be swung out and the scaffold element 11 can be unhooked with its hook-shaped member 9 from the bowl-shaped member 2. Then the scaffold element 11 can be removed from the upright 3.

Figure 5:
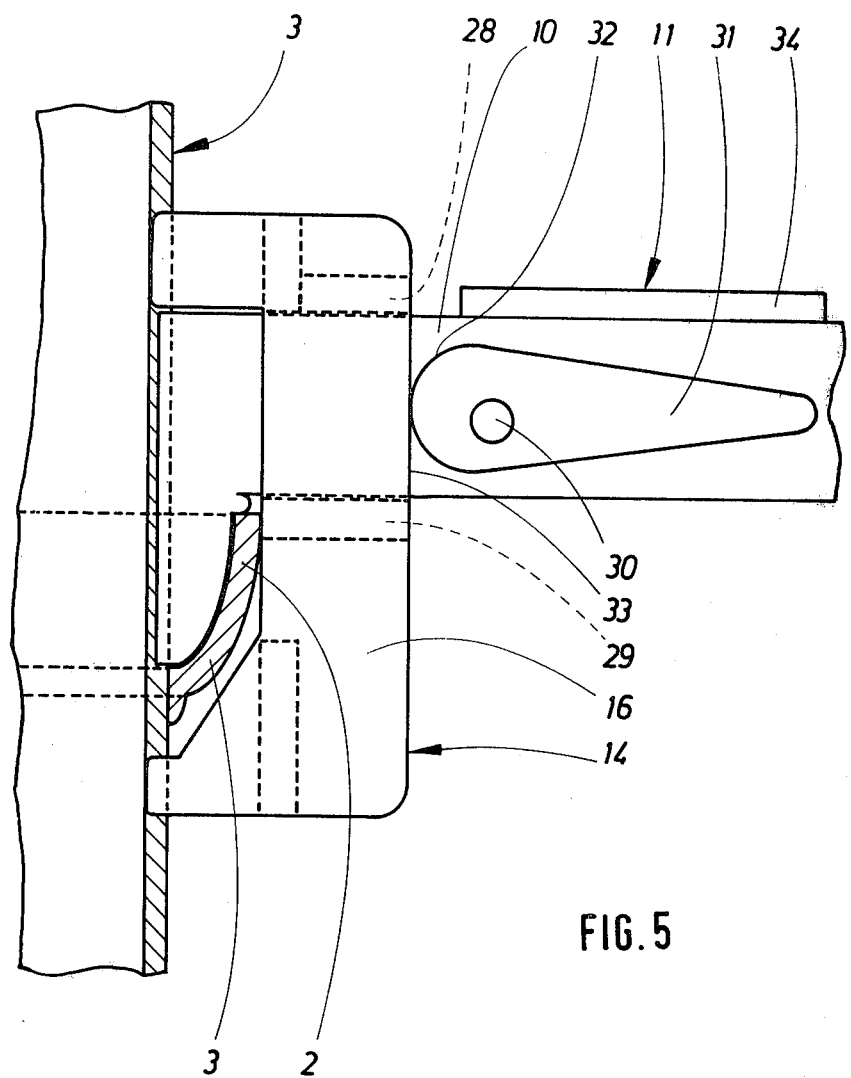

In the embodiment shown in FIG. 5, the clamping member 14 is modified somewhat and provided with an upper and a lower guide wall 28, 29 at each side of the end portion 10 of the scaffold element 11. These guide walls 28, 29 consist, for example, of transverse metal pieces which extend from one end piece 16 to the other. The other clamping member consists, instead of a wedge, in this example of an arm 31 mounted pivotally on an eccentric pin 30 with a clamping surface 32 which is adapted to be placed against the edge surface 33 of the end piece 16. For the symmetrical action of forces, an arm 31 may approximately be disposed at each side of the end portion 10 so that each end piece 16 cooperates with an associated arm. The pin 30 is thus anchored in the scaffold element 11 and extends, for example, through a bore through this. In FIG. 5 the coupling device is shown in the assembled state, in which the clamping member 14 is pressed against the upright in principle in the same manner as in the examples described above, the clamping action coming about by means of the mounting of the arm 31 in the end portion 10 of the scaffold element 11 and pressing with its clamping surfaces 32 against the associated edge surface 33 on each of the end pieces 16 in the clamping member 14. In this assembled position, the arm 31 is protected from accidental manipulation by means of a protective plate 34 which is fitted to the top of the end portion 10 and extends sideways somewhat beyond its width to cover the arm 31 seen from above. During disconnection, the arm 31 or arms are swung down about their pins 30, and as a result of this successively reduced radii in relation to the pin 30 serving as pivotal centre, the clamping member 14 is released and can be moved backwards so that the scaffold element 11 can be unhooked from the upright 3.

Figure 6:
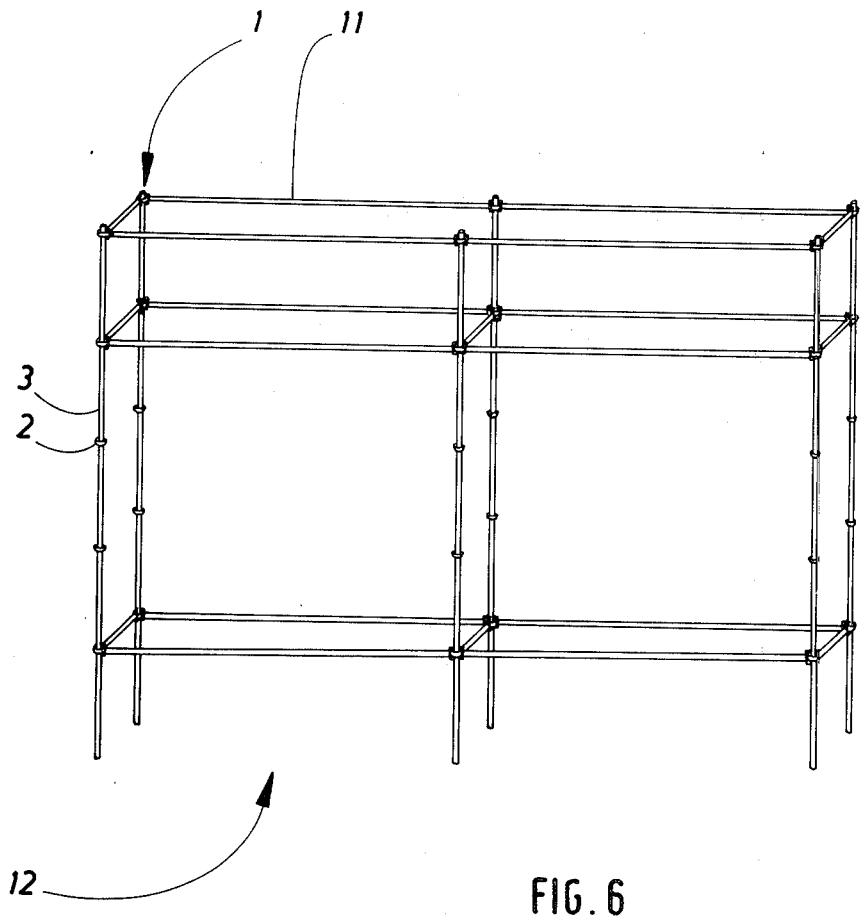
FIG. 6 shows an example of a scaffold provided with coupling devices according to the invention.

FIG. 6 shows an example of a scaffold 12, provided with coupling devices 1 according to the invention. The uprights 3 can thus be provided along their length with bowl-shaped members 2 with even spacing apart, while the transverse scaffold elements 11 each comprise said end portions 10, provided with the hook-shaped members 9 at each of their two ends. As a result of the rigidity which is achieved by means of the coupling device according to the invention, such a scaffold can be lifted, for example by a crane and displaced while retaining its correct shape. For example a scaffold, for example in the form of a lift tower, can be built lying down and then be raised by means of a crane to the upright position of use.

What is important for the present invention is that the end of the horizontal scaffold element, that is to say the hook-shaped member 9 is not pressed against the upright to bear against this but instead away from the upright towards the wall 6 of the bowl-shaped member 2. As a result one and the same centre spacing between the uprights can be maintained with uprights with different diameters but with one and the same spacing between the axial centre and the wall 6 of the bowl-shaped member. This is a great advantage when a scaffold is built up of telescopic uprights that is to say where the upper upright with a smaller dimension is coupled telescopically to lower uprights with larger dimensions.

The invention is not limited to the examples of embodiment described above and shown on the drawings but can be varied within the scope of the following claims. For example, the coupling device according to the invention can be used on other types of scaffold than pure building scaffolds, for example so-called mould stands to support moulds in foundry work. Furthermore, the bowl-shaped member may have another shape, for example it may be made with a plane shell wall and a plane bottom. The bottom can be perforated to a greater or lesser extent, for example the bottom can be replaced by spacing members which support the wall 6.

It is also conceivable for the bowl-shaped member to be replaced by a plurality of yokes determining the maximum number of scaffold elements 11 so that the continuous wall 6 extending with spacing from the upright is replaced by a plurality of separate walls, one for each yoke. The yokes can be formed as U-iron for example. Likewise, both the hook-shaped member 9 and the clamping member 14 can have a completely different shape. The four clamping surfaces can be replaced by an upper and a lower wider coherent clamping surface for example. The clamping member may possibly comprise clamping surfaces adapted to bear against the upright only at one side of the bowl-shaped member, and the clamping member may be movably, for example, pivotally, anchored in the end portion of the scaffold element 11. The clamping member 14 may, for example, consist of one of the end pieces 16 in which case the slit 23 has a lengthened extent in the longitudinal direction of the scaffold element so that the clamping member 14 can be introduced into this, after which the wedge 22 can be driven into the slit 23 outside said first clamping member and be pressed against its edge 33 (see FIG. 5). Said first clamping member may be in two parts, in which case the lower part which forms the lower clamping surface can be displaceable in a groove in the longitudinal direction of the scaffold element and be adapted to be located in a clamping position by said other clamping member, for example a wedge. A threaded nut on the scaffold element can be used as the other clamping member which can be displaced axially by turning about this and press said first clamping member against the upright. The nut can be replaced by another element which can be turned axially round the scaffold element, for example a bevelled length of tube which, on turning, presses the first clamping member against the upright. Furthermore, the hook-shaped member 9 can in practice, be made with a certain play in relation to the upright 3, which nevertheless gives a rigid coupling together without play, according to the principle of the invention. The scaffold element 11 may, instead of a transverse strut, consist of a bracket for example to support wings such as planks or the like or a vertical guide for a lift. In principle, the tube section 15 can be omitted and possibly be replaced by another element.

I claim:

1. A device for coupling together laterally directed scaffold elements and uprights in a scaffold or the like, each coupling device including an engagement member which is connected to the upright and is open upwards at least in the position of use, said engagement member having a wall which extends with spacing from the upright and which defines a space situated between the upright and the wall, a hook-shaped member which is situated at least at one end of said scaffold element and which is adapted to hook into said engagement member, a first clamping member which is movable in relation to the scaffold element and which comprises at least one clamping surface, said first clamping member being arranged with at least said one clamping surface to bear against the upright, and a second clamping member which is adjustable between a release position and a locking position and which is adapted, in the locking position, to be forcibly gripped between said first clamping member and said scaffold element so that said first clamping member is pressed towards the upright and the scaffold element is pressed in the direction out from the upright and as a result is clamped by means of said hook-shaped member in the engagement member.

2. A device as claimed in claim 1, wherein said scaffold element comprises a transverse slit, and said second clamping member comprises a wedge which is adapted to be introduced into the slit in the assembled state of the device and as a result to be pressed against at least one portion of said first clamping member so that the same is pressed in the direction of the upright, and said scaffold element is pressed in the opposite direction.

3. A device as claimed in claim 2, wherein said first clamping member comprises upper and lower clamping surfaces of which the upper clamping surfaces are adapted to bear against a wall of the upright above the engagement member while the lower clamping surfaces are adapted to bear against a wall of the upright below the engagement member.

4. A device as claimed in any one of claims 1 to 3, wherein said first clamping member is composed of two end pieces which comprise said clamping surfaces and which are situated each at its own side of an end portion of the scaffold element and upper and lower transverse pieces which extend between said two end pieces respectively above and below said end portion.

5. A device as claimed in any one of claims 1 to 3, wherein said wall of the engagement member and said intervening space extend continuously around the periphery of the upright enabling a plurality of scaffold elements to engage the engagement member while extending in different directions.

6. A device as claimed in claim 5, wherein said engagement member is substantially bowl-shaped.

7. A device as claimed in claim 4, wherein said transverse piece is adapted to be situated in the assembled state of the device, close to one edge of said transverse slit, the wedge being adapted to be pressed against said transverse piece.

8. A device as claimed in claim 1, wherein said second clamping member comprises a unit mounted eccentrically around a pin in the scaffold element with a curved clamping surface which is adapted to cooperate with an associated edge surface on said first clamping member so that the same is pressed by means of the curved clamping surface into the locking position of said second clamping member but can be moved down by means of a pivotal movement around the pin for release of said first clamping member.

* * * * *